(12) United States Patent
Tomita

(10) Patent No.: US 8,869,849 B2
(45) Date of Patent: Oct. 28, 2014

(54) PNEUMATIC TIRE

(75) Inventor: Akira Tomita, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 600 days.

(21) Appl. No.: 13/146,866

(22) PCT Filed: Jan. 28, 2010

(86) PCT No.: PCT/JP2010/000521
§ 371 (c)(1),
(2), (4) Date: Jul. 28, 2011

(87) PCT Pub. No.: WO2010/087190
PCT Pub. Date: Aug. 5, 2010

(65) Prior Publication Data
US 2011/0277899 A1    Nov. 17, 2011

(30) Foreign Application Priority Data

Jan. 29, 2009  (JP) .................. 2009-018447

(51) Int. Cl.
*B60C 1/00*   (2006.01)
*B60C 11/00*  (2006.01)
*B60C 11/03*  (2006.01)
*B60C 11/04*  (2006.01)

(52) U.S. Cl.
CPC .............. *B60C 11/00* (2013.01); *B60C 11/005* (2013.01); *B60C 2011/0033* (2013.04); *B60C 11/0309* (2013.04); *B60C 2011/0025* (2013.04); *B60C 11/042* (2013.04); *Y10S 152/905* (2013.01)
USPC ...................... 152/209.5; 152/905

(58) Field of Classification Search
CPC  B60C 11/00; B60C 11/0008; B60C 11/0041; B60C 11/005; B60C 11/0058; B60C 11/0066; B60C 11/0075; B60C 1/00; B60C 1/0016; B60C 2001/00; B60C 2001/0083; B60C 2011/00; B60C 2011/0016; B60C 2011/0025; B60C 2011/0033
USPC ......... 152/209.1, 209.5, 209.6, 905, 450, 525
See application file for complete search history.

(56) References Cited

U.S. PATENT DOCUMENTS 4,588,009 A * 5/1986 Kitazawa et al. .......... 152/209.5
4,603,721 A * 8/1986 Kogure et al. ............. 152/209.5
(Continued)

FOREIGN PATENT DOCUMENTS

EP   1 491 368 A2   12/2004
GB   2 077 671 A    12/1981
(Continued)

OTHER PUBLICATIONS

Chinese Office Action, dated Dec. 10, 2013, issued in corresponding Chinese Patent Application No. 201080014214.4.
(Continued)

*Primary Examiner* — Eric Hug
(74) *Attorney, Agent, or Firm* — Sughrue Mion, PLLC

(57) ABSTRACT

A pneumatic tire for improving uneven wear resistance of a tread is provided. A pneumatic tire comprises a carcass serving as a framework and toroidally extending between a pair of bead cores, a belt and a tread disposed on a radially outer side of the carcass, wherein the tread comprises a plurality of tread rubber layers, dynamic elasticity of the outer tread rubber layer located in a radially outermost side of the tire is higher than dynamic elasticity of the inner tread rubber layer located in a radially innermost side of the tire, and a thickness of the inner tread rubber layer in a tire equatorial plane is smaller than a thickness of the inner tread rubber layer in other regions.

15 Claims, 5 Drawing Sheets

(56) References Cited

U.S. PATENT DOCUMENTS

| | | | |
|---|---|---|---|
| 5,046,542 A | * | 9/1991 | Ohta et al. .................. 152/209.5 |
| 2010/0154949 A1 | * | 6/2010 | Nagai ......................... 152/209.5 |

FOREIGN PATENT DOCUMENTS

| | | |
|---|---|---|
| JP | 61-229602 A | 10/1986 |
| JP | 3-82609 A | 4/1991 |
| JP | 2000-016020 A | 1/2000 |
| JP | 2001-071708 A | 3/2001 |
| JP | 2001-191732 A | 7/2001 |
| JP | 2003-127613 A | 5/2003 |
| JP | 2005-035404 A | 2/2005 |
| JP | 2007-137134 A | 6/2007 |
| WO | WO 2008/143104 * | 11/2008 |

OTHER PUBLICATIONS

Japanese Office Action, dated Aug. 13, 2013, issued in corresponding Japanese Patent Application No. 2010-548434.

Extended European Search Report, dated Jul. 16, 2013, issued in corresponding European Patent Application No. 10735662.8.

Japanese Notification, dated May 7, 2013, issued in corresponding Japanese Patent Application No. 2010-548434.

Chinese Office Action issued in Chinese Application No. 201080014214.4 dated May 3, 2013.

Japanese Office Action, dated Mar. 11, 2014, issued in corresponding Japanese Patent Application No. 2010-548434.

* cited by examiner

PNEUMATIC TIRE

CROSS REFERENCE TO RELATED APPLICATION

This application is a National Stage of International Application No. PCT/JP2010/000521 filed Jan. 28, 2010, claiming priority based on Japanese Patent Application No. 2009-018447 filed Jan. 29, 2009, the contents of all of which are incorporated herein by reference in their entirety.

TECHNICAL FIELD

The present invention relates to a pneumatic tire for improving uneven wear resistance performance of a tread.

RELATED ART

Conventionally, in order to satisfy various kinds of performances at the same time, a pneumatic tire has adopted so-called cap/base structure in which a tread comprises two tread rubber layers.

For example, JP2003-127613 describes a radial tire for a heavy load, in which rubber hardness of a cap rubber layer and a base rubber layer and their hardness difference are specified, the base rubber layer comprises a pair of base rubber pieces which are discontinuously disposed in the both sides of a tire equatorial plane, and the thickness of this base rubber piece is increased from the inner to outer side in the tire width direction so that wear resistance can be highly maintained and increase in temperature of the tread is restrained to improve durability.

DISCLOSURE OF THE INVENTION

Problems to be Solved by the Invention

However, the base rubber layer of the above-mentioned radial tire for a heavy load comprises a pair of base rubber pieces which are discontinuously disposed in the both sides of the tire equatorial plane so that the cap rubber layer having higher hardness is in contact with a belt. Therefore, especially when wear is progressed, stress is concentrated in a center portion due to wear of a shoulder portion so that the tread is likely to be come off. In addition, sufficient measures as to uneven wear of the tread are not taken in this tire.

It is, therefore, an object of the present invention is to provide a pneumatic tire for preventing a tread from coming off and for improving uneven wear resistance performance of the tread.

Means for Solving the Problem

The subject matter of the present invention is as follows.

[1] A pneumatic tire comprising a carcass serving as a framework and toroidally extending between a pair of bead cores, a belt and a tread disposed on a radially outer side of the carcass, wherein the tread comprises a plurality of tread rubber layers, dynamic elasticity of the outer tread rubber layer located in a radially outermost side of the tire is higher than dynamic elasticity of the inner tread rubber layer located in a radially innermost side of the tire, and a thickness of the inner tread rubber layer in a region including a tire equatorial plane is smaller than a thickness of the inner tread rubber layer in other regions.

[2] The pneumatic tire according to the above item [1], wherein the thickness of the inner tread rubber layer gradually increases from the tire equatorial plane toward a tread ground contact end.

[3] The pneumatic tire according to the above item [1] or [2], wherein the inner tread rubber layer is continuously disposed in a tire width direction.

[4] The pneumatic tire according to the above item [1] or [2], wherein a thickness of the inner tread rubber layer in an inner end portion in a tire width direction is smaller than a thickness of the inner tread rubber layer in other portions and the inner end portion in the tire width direction of the inner tread rubber layer is located 0.2 W to 0.4 W away from the tire equatorial plane assuming that a tread half width is W.

[5] The pneumatic tire according to the above item [2], wherein a thickness of the inner tread rubber layer in an inner end portion in a tire width direction is smaller than a thickness of the inner tread rubber layer in other portions, the inner end portion in the tire width direction of the inner tread rubber layer is located 0.45 W to 0.75 W away from the tire equatorial plane assuming that a tread half width is W, an aspect ratio is not more than 55%, and a tire section width is not less than 350 mm.

[6] The pneumatic tire according to any one of the above items [1] to [5], wherein dynamic elasticity of the outer tread rubber layer is 8.0 MPa to 20 MPa and dynamic elasticity of the inner tread rubber layer is 1.0 MPa to 7.0 MPa.

[7] The pneumatic tire according to any one of the above items [1] to [6], wherein assuming that a tread half width is W, a thickness d1 of the inner tread rubber layer at the tire equatorial plane, a thickness d2 of the inner tread rubber layer at a position of W/3 away from the tire equatorial plane, a thickness d3 of the inner tread rubber layer at a position of 2 W/3 away from the tire equatorial plane, and a length d4 of a line passing across the inner tread rubber layer of a normal line of the carcass passing through the tread ground contact end satisfy the following expressions (1) to (4).

Note $$0 \leq d1 \leq 0.4 \ast d4 \tag{1}$$

$$0 \leq d2 \leq 0.4 \ast d4 \tag{2}$$

$$0.5 \ast d4 \leq d3 \leq 1.1 \ast d4 \tag{3}$$

$$3 \text{ mm} \leq d4 \leq 12 \text{ mm} \tag{4}$$

[8] The pneumatic tire according to any one of the above items [1] to [7], wherein dynamic elasticity of the outer tread rubber layer is 1.5 to 3.5 times more than dynamic elasticity of the inner tread rubber layer at temperature of 25° C., at frequency of 52 Hz and at strain of 2%.

Effect of the Invention

According to the present invention, a pneumatic tire for improving uneven wear resistance performance of a tread and durability of a belt can be provided.

BEST MODE FOR CARRYING OUT THE INVENTION

Hereinafter, the present invention will be described in detail with reference to the drawings.

Figure 1:
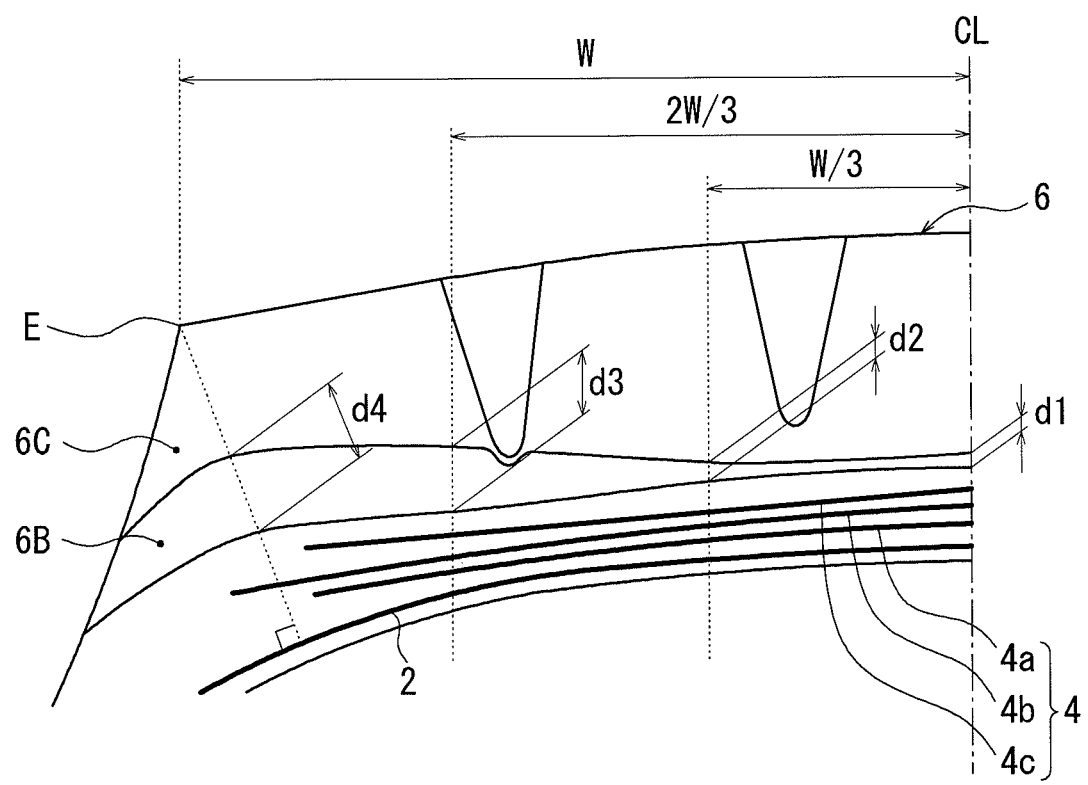
FIG. 1 is a widthwise sectional view of a half portion of a pneumatic tire according to the first embodiment of the present invention.

FIG. 1 is a widthwise sectional view of a half portion of a pneumatic tire according to the first embodiment of the present invention. A pneumatic tire of the invention comprises a carcass 2 serving as a framework and toroidally extending between a pair of bead cores, a belt 4 consisting of three belt layers in this example and a tread 6 disposed on the radially outer side of the carcass 2. These three belt layers 4a, 4b, 4c are inclined belt layers disposed in this order from the radially inner side of the tire and each belt layer has a number of cords coated with rubber, which are inclined with respect to the tire equatorial plane CL and extending in an intersecting direction with respect to the cords of the adjacent belt layer.

The tread 6 comprises a plurality of tread rubber layers, and more specifically, in this example, adopts so-called cap/base structure in which the tread 6 comprises two layers of a cap rubber 6C which is an outer tread rubber layer located in the radially outermost side of the tire and a base rubber 6B which is an inner tread rubber layer located in the radially innermost side of the tire. Each of the cap rubber layer 6C and the base rubber layer 6B is continuously disposed in tire width direction.

In case that the tread 6 comprises three or more tread rubber layers, dynamic elasticity of the outer tread rubber layer located in the radially outermost side of the tire and dynamic elasticity of the inner tread rubber layer located in the radially innermost side of the tire are specified and a thickness of the inner tread rubber layer is specified. It is preferable that the tread 6 comprises two layers of tread rubber layers as shown in FIG. 1 and the case when the tread 6 comprises two layers of tread rubber layers will be explained in the following. However, the present invention is not limited to this case.

It is important that dynamic elasticity of the cap rubber layer 6C is higher than dynamic elasticity of the base rubber layer 6B and a thickness of the base rubber layer 6B in a region including the tire equatorial plane CL is smaller than a thickness of the base rubber layer 6B in other regions. The reason for this will be explained below.

It is noted that "region including the tire equatorial plane CL (hereinafter, referred to as tread center portion)" means a region having W/3 in the tire width direction with the tire equatorial plane CL being as a center (W: tread half width) and "thickness of the base rubber layer 6B in the tread center portion" means an average thickness of the base rubber layer 6B in this region. In addition, when the base rubber layer 6B is disposed in the tread center portion in the second and third embodiments described below, "thickness of the base rubber layer 6B in the tread center portion" means an average thickness of the base rubber layer 6B which is disposed in the region.

Conventionally, to satisfy both of wear resistance performance and belt durability performance, high durability rubber was disposed in the road surface side of the tread 6 and low-heat-generating rubber was disposed in the belt 4 side. However, it is known that ground contact pressure of a tire is the highest in a ground contact center portion, namely, the tread center portion and is gradually reduced toward the shoulder portion. Such uneven ground contact pressure causes uneven wear of the tread 6.

In the present invention, in addition to increasing dynamic elasticity of the high durability rubber disposed in the radially outer side of the tire and decreasing dynamic elasticity of the low-heat-generating rubber disposed in the radially inner side of the tire, by gradually increasing the ratio of the low-heat-generating rubber from the tread center portion toward the shoulder portion, width direction distribution in dynamic elasticity of the tread 6 is gained, which results in strain equalization of the tread 6 successfully.

In addition, by disposing soft and low-heat-generating rubber in the tread shoulder portion, even when wear is progressed, the ground contact pressure is kept even so that belt durability is also improved.

In addition, it is preferable that the thickness of the base rubber layer 6B is gradually increased from the tire equatorial plane CL toward a tread ground contact end E and an interface between the cap rubber layer 6C and the base rubber layer 6B is inclined in the radially outer side as it proceeds from the inner to outer side in the tire width direction except a range of a groove width of a groove formed in the tread.

As shown in FIG. 1, the thickness of the base rubber layer 6B may be the largest in the neighborhood of the tread ground contact end E and may be decreased in a region outside of the neighborhood of the tread ground contact end E in the tire width direction.

The term "neighborhood of the tread ground contact end E" as used herein means a region within a range of ±3.0 cm with a normal line of the carcass 2 being as a center, which passes through the tread ground contact end E. In addition, the tread ground contact end E is calculated when the tire is mounted on a regular rim and applied with the maximum load and the maximum air pressure (defined in JATMA, TRA, ETRTO).

As to specific dynamic elasticity of the tread rubber layer, it is preferable that dynamic elasticity of the cap rubber layer 6C is 8.0 MPa to 20.0 MPa and dynamic elasticity of the base rubber layer 6B is 1.0 MPa to 7.0 MPa.

When dynamic elasticity of the cap rubber layer 6C is less than 8.0 MPa, the effect of reducing wear of the tread 6 may be insufficient. On the other hand, when dynamic elasticity of the cap rubber layer 6C is more than 20.0 MPa, grip performance may be insufficient.

When dynamic elasticity of the base rubber layer 6B is less than 1.0 MPa, driving stability may be degraded. On the other hand, when dynamic elasticity of the base rubber layer 6B is more than 7.0 MPa, dynamic elasticity of the base rubber layer 6B is insufficient and therefore may not sufficiently contribute to tread coming-off performance.

It is noted that dynamic elasticity (MPa) is measured at temperature of 25° C., at frequency of 52 Hz and at strain of 2% with a spectrometer.

Assuming that a tread half width is W as shown in FIG. 1, it is preferable that a thickness d1 of the base rubber layer 6B at the tire equatorial plane CL, a thickness d2 of the base rubber layer 6B at a position of W/3 away from the tire equatorial plane CL, a thickness d3 of the base rubber layer 6B at a position of 2 W/3 away from the tire equatorial plane CL, and a length d4 of a line passing across the base rubber layer 6B of a normal line of the carcass 2 passing through the tread ground contact end E satisfy the following expressions (1) to (4).

It is noted that each of the thickness d1, d2 and d3 of the base rubber layer 6B is measured in a direction perpendicular to the tire axis.

Note $$0 \leq d1 \leq 0.4*d4 \quad (1)$$

$$0 \leq d2 \leq 0.4*d4 \quad (2)$$

$$0.5*d4 \leq d3 \leq 1.1*d4 \quad (3)$$

$$3 \text{ mm} \leq d4 \leq 12 \text{ mm} \quad (4)$$

In case of d1>0.4*d4, d2>0.4*d4 and d3>1.1*d4, the effect of even wear may not be sufficient. In case of d4>12 mm, the base rubber layer 6B may be exposed in the later stage of wear, which may cause uneven wear.

In case of d3<0.5*d4 or d4<3 mm, the tread may generate large heat and have poor belt durability and poor durability to coming-off of the tread.

It is preferable that dynamic elasticity of the cap rubber layer 6C is 1.5 to 3.5 times more than dynamic elasticity of the base rubber layer 6B at temperature of 25° C., at frequency of 52 Hz and at strain of 2%.

When the ratio of dynamic elasticity is less than 1.5, the difference in dynamic elasticity of the rubber is insufficient and dynamic elasticity change of the cap and base rubber layers in total may become insufficient.

On the other hand, when the ratio of dynamic elasticity is more than 3.5, production difficulty may arise.

Next, with reference to FIG. 2, the second embodiment of the present invention will be described.

The second embodiment is different from the first embodiment in that the base rubber layer 6B is not continuous in the tire width direction but discontinuous in the tire equatorial plane CL. A thickness of the base rubber layer 6B in an inner end portion in the tire width direction is smaller than a thickness of the base rubber layer 6B in other portions and the inner end 6BE in the tire width direction of the base rubber layer 6B is located 0.2 W to 0.4 W away from the tire equatorial plane CL.

It is noted that "inner end portion in the tire width direction of the base rubber layer 6B" means a region from the inner end 6BE in the tire width direction of the base rubber layer 6B to a point of 0.1 W away from the inner end 6BE in the widthwise outer direction of the tire and "thickness of the base rubber layer 6B in the inner end portion in the tire width direction" means an average thickness of the base rubber layer 6B which is disposed in the portion.

In this way, by not disposing the base rubber layer 6B in the tire equatorial plane CL, as the entire tread 6 combining the cap rubber layer 6C and the base rubber layer 6B, the difference of dynamic elasticity in the tread center portion and the tread shoulder portion becomes large so that uneven wear of the tread shoulder portion can be largely restrained. As described above, uneven wear of the tread shoulder portion is largely restrained so that the tread can be prevented from coming off even when wear of tread is progressed.

It is noted that the tread shoulder portion means a region between the tread ground contact end E and a circumferential groove which is firstly formed from the tread ground contact end E toward the tire widthwise inner direction.

When the inner end 6BE in the tire width direction of the base rubber layer 6B is located less than 0.2 W away from the tire equatorial plane CL, productivity of a tire may be reduced and the effect of restraining uneven wear of the tread shoulder portion cannot be sufficiently obtained. On the other hand, when the inner end 6BE in the tire width direction of the base rubber layer 6B is located more than 0.4 W away from the tire equatorial plane CL, dynamic elasticity of the tread shoulder portion and an intermediate block portion becomes excessively large, which may cause uneven wear of the intermediate block portion.

It is preferable that the inner end 6BE in the tire width direction of the base rubber layer 6B is located more than 0.3 W and less than 0.4 W away from the tire equatorial plane CL.

Figure 3:
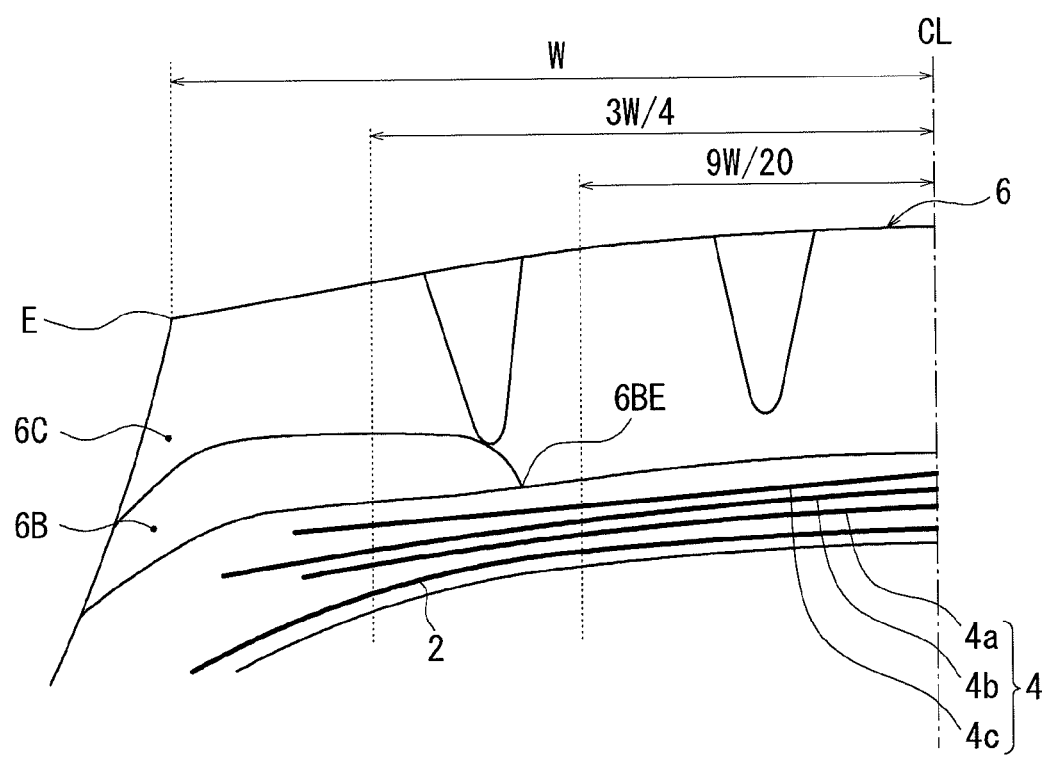
FIG. 3 is a widthwise sectional view of a half portion of a pneumatic tire according to the third embodiment of the present invention.

FIG. 3 is a widthwise sectional view of a half portion of a pneumatic tire according to the third embodiment of the present invention. In the third embodiment, a tire having an aspect ratio of not more than 55% and a tire section width of not less than 350 mm is assumed. Same as the second embodiment, the base rubber layer 6B is not continuous in the tire width direction but discontinuous in the tire equatorial plane CL. The inner end 6BE in the tire width direction of the base rubber layer 6B is located 0.45 W to 0.75 W away from the tire equatorial plane CL. The thickness of the base rubber layer 6B is gradually increased from the inner end 6BE toward the tread ground contact end E.

The effect that the base rubber layer 6B is discontinuous in the tire equatorial plane CL and the reason for limiting the location of the inner end 6BE in the tire width direction of the base rubber layer 6B are similar to those described with reference to the second embodiment.

EXAMPLE

Example pneumatic tires, Conventional Example pneumatic tire and Comparative Example pneumatic tire are experimentally produced under specifications to be described below and evaluated for uneven wear resistance performance, wear performance and heat generation property of the tread.

Conventional Example tire comprises a tread consisting of one layer of tread rubber layer.

Figure 4:
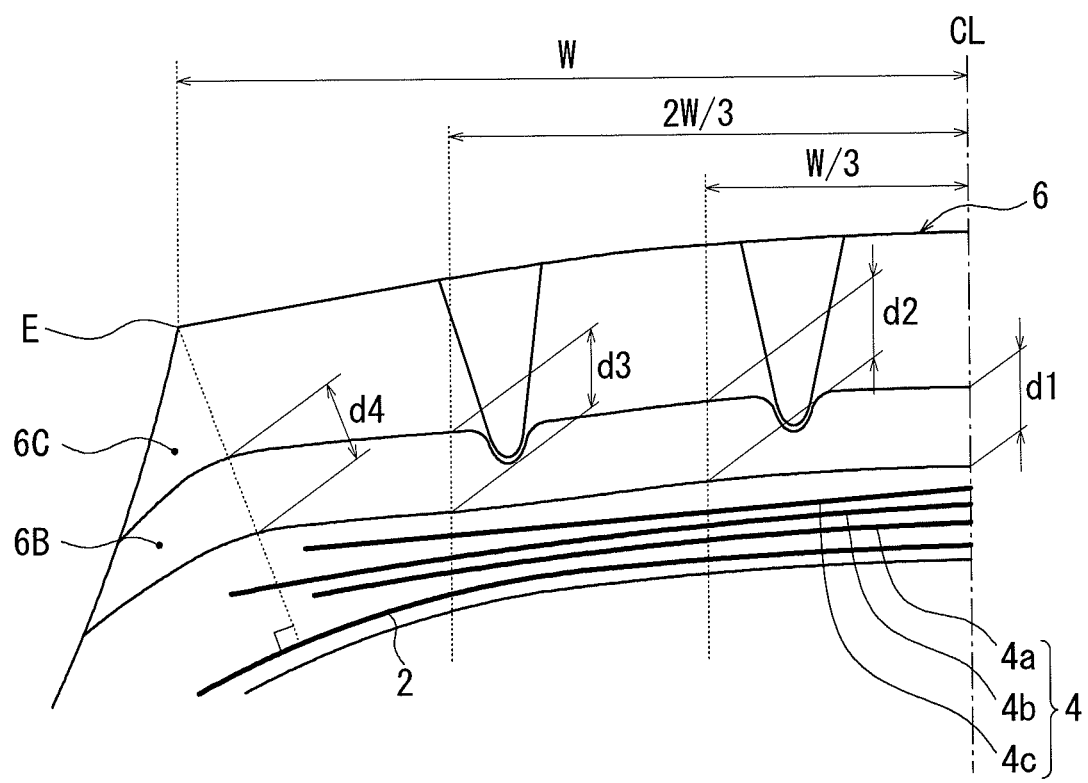
FIG. 4 is a widthwise sectional view of a half portion of a conventional pneumatic tire.

Example tires 1 to 17 and Comparative Example tire comprise a cap rubber layer 6C and a base rubber 6B which is continuous in the tire width direction. Each of Example tires 1 to 17 is provided with a base rubber layer 6B having a small thickness in the tire equatorial plane CL and a large thickness in the shoulder side as shown in FIG. 1 while Comparative Example tire is provided with a base rubber layer 6B having an even thickness as shown in FIG. 4.

Figure 2:
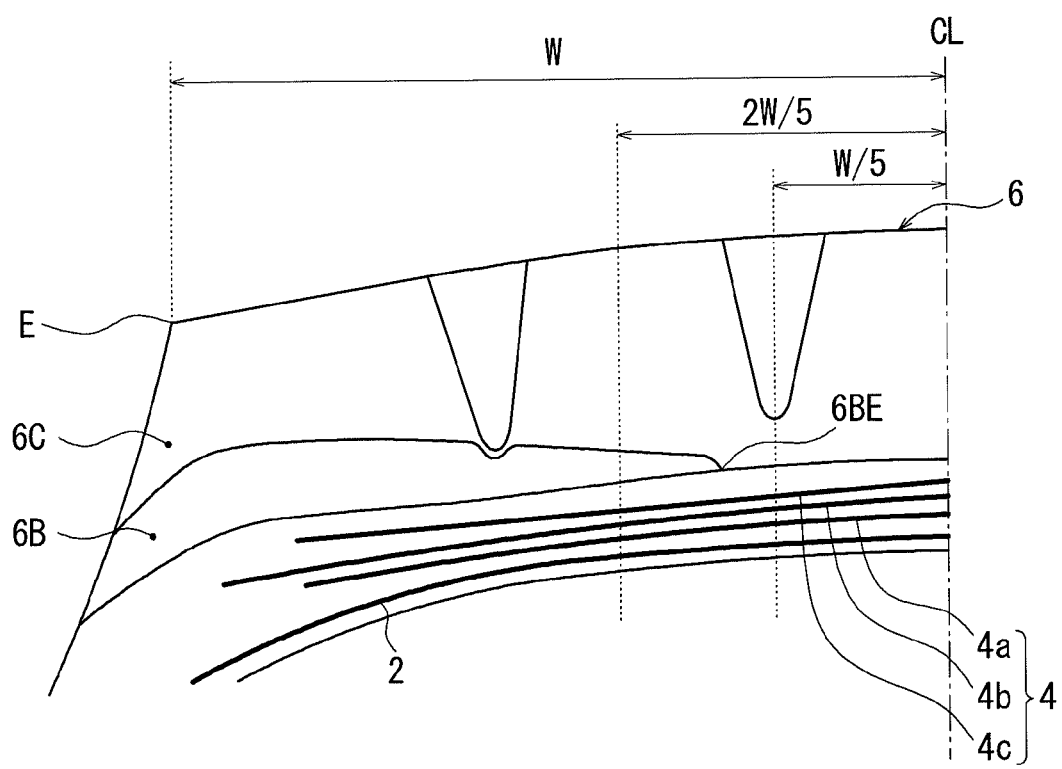
FIG. 2 is a widthwise sectional view of a half portion of a pneumatic tire according to the second embodiment of the present invention.

Example tire 18 is not provided with a base rubber layer 6B in the tire equatorial plane CL as shown in FIG. 2. The inner end 6BE in the tire width direction of the base rubber layer 6B is located ⅓ W away from the tire equatorial plane CL.

Example tire 19 is not provides with a base rubber layer 6B in the tire equatorial plane CL as shown in FIG. 3. The inner end 6BE in the tire width direction of the base rubber layer 6B is located 0.6 W away from the tire equatorial plane CL.

Table 1 shows thicknesses d1 to d4 of the base rubber layer 6B and dynamic elasticity of the rubber layers of each test tire.

(Measurements of Wear Resistance Performance and Uneven Wear Resistance Performance)

Each test tire (Example tires 1 to 18 and Comparative Example tire: tire size of 275/80R22.5, Example tire 19: tire size of 445/50R22.5) is mounted on a rim of 7.50 J to form a tire wheel, applied with the regular internal pressure, attached to a drum examination machine and then continuously travel at test speed of 70 km/h to measure wear volume of the tread. The results are shown in index values with the wear resistance performance of Conventional Example tire being defined as 100 in Table 1. The larger value means the better wear resistance performance.

Figure 5:
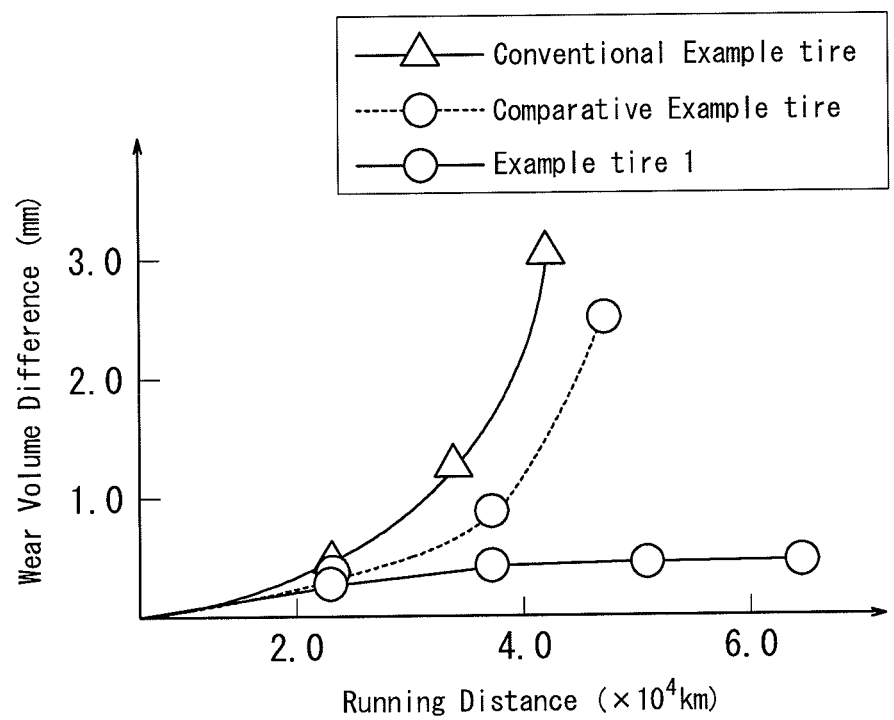
FIG. 5 is a view showing measurement results of uneven wear resistance performance of Example tire and Conventional Example tire.

In addition, as for Conventional Example tire, Comparative Example tire and Example tire 1, wear volume difference between a center rib and a shoulder rib is measured. The measurement results of wear volume difference are shown in FIG. 5.

It is noted that "regular internal pressure" refers to an air pressure corresponding to the maximum load capacity at applied size and ply rating defined in JATMA YEAR BOOK published in 2007 by the Japan Automobile Tyre Manufactures Association.

(Measurements of Heat Generation Property)

Each test tire (Example tires 1 to 18 and Comparative Example tire: tire size of 275/80R22.5, Example tire 19: tire size of 445/50R22.5) is mounted on a rim of 7.50 J to form a tire wheel, applied with the regular internal pressure, attached to a drum examination machine and then a drum examination at constant speed (65 km/h) under step road condition is performed to measure running distance when the tire diameter is increased more than 5% due to inner separation. The results are shown in index values with the heat generation property of Conventional Example tire being defined as 100 in Table 1. The larger value means the better heat generation property.

Breaking energy of rubber is significantly decreased if temperature of the rubber is high. In addition, time degradation of breaking energy is increased if temperature of the rubber is high. The above-mentioned phenomenon by temperature can be indirectly caught as creep phenomenon (collapse) of the rubber. In case of a tire, since creep of rubber is seen in diameter growth, amount of diameter growth after a constant distance running can be a surrogate indicator of inner separation. Therefore, by measuring running distance when the tire diameter is increased more than 5% due to inner separation, it is possible to evaluate heat generation property.

(Results of Uneven Wear Resistance Performance)

With reference to FIG. 5, in Conventional Example tire, the wear volume difference becomes 3.0 mm at the time of running distance of 40,000 km to finish the measurement. In Comparative Example tire, the wear volume difference becomes 2.5 mm at the time of running distance of 48,000 km to finish the measurement. In Example tire 1, the wear volume difference is not more than 0.5 mm at the time of running distance of 60,000 km.

Thus, it is found that, in Example tire 1, dynamic elasticity of the tread rubber is gradually decreased toward the shoulder portion in comparison to Conventional Example tire and Comparative Example tire so that uneven wear resistance is significantly improved.

(Results of Wear Resistance Performance and Heat Generation Property)

It is found from Table 1 that, in Example tires and Comparative Example tire, dynamic elasticity of the tread rubber in the road surface side is higher than that of Conventional Example tire so that wear resistance performance is improved. It is also found that, by specifying the thickness of the base rubber layer, lower heat generation property is achieved in Example tires in comparison to Conventional Example tire.

According to the present invention, the tread comprises a plurality of tread rubber layers and dynamic elasticity of each tread rubber layer is specified so that a pneumatic tire for improving uneven wear resistance performance, wear performance and heat generation property can be provided.

DESCRIPTION OF REFERENCE NUMERALS 2 carcass
4 belt

TABLE 1

| | d1 | d2 | d3 | d4 | dynamic elasticity of cap rubber layer | dynamic elasticity of base rubber layer | Wear resistance performance | Heat generating property | Remarks |
|---|---|---|---|---|---|---|---|---|---|
| Conventional Example tire | — | — | — | — | | 6.0 | 100 | 100 | |
| Comparative Example tire | 5 | 5 | 5 | 5 | 8.0 | 4.0 | 150 | 150 | |
| Example tire 1 | 1 | 1 | 6 | 6 | 8.0 | 4.0 | 170 | 150 | |
| Example tire 2 | 1 | 1 | 6 | 6 | 20 | 4.0 | 200 | 150 | (*1) |
| Example tire 3 | 1 | 1 | 6 | 6 | 25 | 4.0 | 150 | 150 | (*1) |
| Example tire 4 | 1 | 1 | 6 | 6 | 8.0 | 1.0 | 150 | 150 | (*2) |
| Example tire 5 | 1 | 1 | 6 | 6 | 8.0 | 0.50 | 150 | 150 | (*2) |
| Example tire 6 | 1 | 1 | 6 | 6 | 8.0 | 7.0 | 150 | 150 | (*3) |
| Example tire 7 | 1 | 1 | 6 | 6 | 8.0 | 7.5 | 150 | 150 | (*3) |
| Example tire 8 | 1 | 1 | 3 | 3 | 8.0 | 4.0 | 150 | 130 | (*3)(*4) |
| Example tire 9 | 1 | 1 | 2.5 | 2.5 | 8.0 | 4.0 | 150 | 110 | (*3)(*4) |
| Example tire 10 | 1 | 1 | 12 | 12 | 8.0 | 4.0 | 150 | 170 | (*5) |
| Example tire 11 | 1 | 1 | 12.5 | 12.5 | 8.0 | 4.0 | 150 | 190 | (*5) |
| Example tire 12 | 1 | 1 | 3 | 6 | 8.0 | 4.0 | 150 | 140 | (*6) |
| Example tire 13 | 1 | 1 | 2.5 | 6 | 8.0 | 4.0 | 150 | 130 | (*6) |
| Example tire 14 | 1 | 1 | 6.6 | 6 | 8.0 | 4.0 | 150 | 160 | (*5) |
| Example tire 15 | 1 | 1 | 7 | 6 | 8.0 | 4.0 | 150 | 170 | (*5) |
| Example tire 16 | 2.4 | 2.4 | 6 | 6 | 8.0 | 4.0 | 150 | 150 | (*3) |
| Example tire 17 | 3 | 3 | 6 | 6 | 8.0 | 4.0 | 150 | 150 | (*3) |
| Example tire 18 | 0 | 0 | 6 | 6 | 8.0 | 4.0 | 190 | 150 | (*7) |
| Example tire 19 | 0 | 0 | 6 | 6 | 8.0 | 4.0 | 190 | 150 | (*7) |

(*1): Production is difficult in comparison to Example tire 1.
(*2): Driving stability is degraded in comparison to Example tire 1.
(*3): Uneven wear performance is insufficiently improved in comparison to Example tire 1.
(*4): Heat generation property is degraded in comparison to Example tire 1.
(*5): Poor appearance due to exposure of the base rubber layer occurs in comparison to Example tire 1.
(*6): Heat generation property is slightly degraded in comparison to Example tire 1.
(*7): Productivity is slightly degraded in comparison to Example tire 1.

4a, 4b, 4c inclined belt layer
6 tread
6C cap rubber layer
6B base rubber layer

The invention claimed is:

1. A pneumatic tire comprising a carcass serving as a framework and toroidally extending between a pair of bead cores, a belt and a tread disposed on a radially outer side of the carcass, wherein
the tread comprises a plurality of tread rubber layers,
dynamic elasticity of the outer tread rubber layer located in a radially outermost side of the tire is higher than dynamic elasticity of the inner tread rubber layer located in a radially innermost side of the tire,
a thickness of the inner tread rubber layer in an inner end portion in a tire width direction is smaller than a thickness of the inner tread rubber layer in other portions, and
the inner end portion in the tire width direction of the inner tread rubber layer is located 0.2 W to 0.4 W away from the tire equatorial plane wherein W is a tread half width.

2. The pneumatic tire according to claim 1, wherein
dynamic elasticity of the outer tread rubber layer is 8.0 MPa to 20 MPa and
dynamic elasticity of the inner tread rubber layer is 1.0 MPa to 7.0 MPa.

3. The pneumatic tire according to claim 1, wherein dynamic elasticity of the outer tread rubber layer is 1.5 to 3.5 times more than dynamic elasticity of the inner tread rubber layer at temperature of 25° C., at frequency of 52 Hz and at strain of 2%.

4. A pneumatic tire comprising a carcass serving as a framework and toroidally extending between a pair of bead cores, a belt and a tread disposed on a radially outer side of the carcass, wherein
the tread comprises a plurality of tread rubber layers,
dynamic elasticity of the outer tread rubber layer located in a radially outermost side of the tire is higher than dynamic elasticity of the inner tread rubber layer located in a radially innermost side of the tire, and
a thickness of the inner tread rubber layer in an inner end portion in a tire width direction is smaller than a thickness of the inner tread rubber layer in other portions,
the thickness of the inner tread rubber layer gradually increases from the tire equatorial plane side toward a tread ground contact end side,
the inner end portion in the tire width direction of the inner tread rubber layer is located 0.45 W to 0.75 W away from the tire equatorial plane, wherein W is a tread half width,
an aspect ratio is not more than 55%, and
a tire section width is not less than 350 mm.

5. The pneumatic tire according to claim 4, wherein
dynamic elasticity of the outer tread rubber layer is 8.0 MPa to 20 MPa and
dynamic elasticity of the inner tread rubber layer is 1.0 MPa to 7.0 MPa.

6. The pneumatic tire according to claim 4, wherein dynamic elasticity of the outer tread rubber layer is 1.5 to 3.5 times more than dynamic elasticity of the inner tread rubber layer at temperature of 25° C., at frequency of 52 Hz and at strain of 2%.

7. A pneumatic tire comprising a carcass serving as a framework and toroidally extending between a pair of bead cores, a belt and a tread disposed on a radially outer side of the carcass, wherein
the tread comprises a plurality of tread rubber layers,
dynamic elasticity of the outer tread rubber layer located in a radially outermost side of the tire is higher than dynamic elasticity of the inner tread rubber layer located in a radially innermost side of the tire, and
a thickness of the inner tread rubber layer in a region including a tire equatorial plane is smaller than a thickness of the inner tread rubber layer in other regions,
wherein
assuming that a tread half width is W,
a thickness d1 of the inner tread rubber layer at the tire equatorial plane, a thickness d2 of the inner tread rubber layer at a position of W/3 away from the tire equatorial plane, a thickness d3 of the inner tread rubber layer at a position of 2 W/3 away from the tire equatorial plane, and a length d4 of a line passing across the inner tread rubber layer of a normal line of the carcass passing through the tread ground contact end satisfy the following expressions (1) to (4), $$0 \leq d1 \leq 0.4 \ast d4 \quad (1)$$

$$0 \leq d2 \leq 0.4 \ast d4 \quad (2)$$

$$0.5 \ast d4 \leq d3 \leq 1.1 \ast d4 \quad (3)$$

$$3 \text{ mm} \leq d4 \leq 12 \text{ mm} \quad (4).$$

8. The pneumatic tire according to claim 7, wherein the thickness of the inner tread rubber layer gradually increases from the tire equatorial plane toward a tread ground contact end.

9. The pneumatic tire according to claim 7, wherein the inner tread rubber layer is continuously disposed in a tire width direction.

10. The pneumatic tire according to claim 7, wherein
dynamic elasticity of the outer tread rubber layer is 8.0 MPa to 20 MPa and
dynamic elasticity of the inner tread rubber layer is 1.0 MPa to 7.0 MPa.

11. The pneumatic tire according to claim 7, wherein dynamic elasticity of the outer tread rubber layer is 1.5 to 3.5 times more than dynamic elasticity of the inner tread rubber layer at temperature of 25° C., at frequency of 52 Hz and at strain of 2%.

12. A pneumatic tire comprising a carcass serving as a framework and toroidally extending between a pair of bead cores, a belt and a tread disposed on a radially outer side of the carcass, wherein
the tread comprising a plurality of tread rubber layers,
dynamic elasticity of the outer tread rubber layer located in a radially outermost side of the tire is higher than dynamic elasticity of the inner tread rubber layer located in a radially innermost side of the tire, and
thickness of the inner tread rubber layer in a region including a tire equatorial plane is smaller than a thickness of the inner tread rubber layer in other regions, wherein
dynamic elasticity of the outer tread rubber layer is 1.5 to 3.5 times more than dynamic elasticity of the inner tread rubber layer at temperature of 25° C., at frequency of 52 Hz and at strain of 2%.

13. The pneumatic tire according to claim 12, wherein the thickness of the inner tread rubber layer gradually increases from the tire equatorial plane toward a tread ground contact end.

14. The pneumatic tire according to claim 12, wherein the inner tread rubber layer is continuously disposed in a tire width direction.

15. The pneumatic tire according to claim 12, wherein
dynamic elasticity of the outer tread rubber layer is 8.0 MPa to 20 MPa and
dynamic elasticity of the inner tread rubber layer is 1.0 MPa to 7.0 MPa.

* * * * *